(12) United States Patent
Adams et al.

(10) Patent No.: US 8,342,256 B2
(45) Date of Patent: Jan. 1, 2013

(54) FOLDABLE FARM IMPLEMENT

(75) Inventors: Brian Adams, Centralia, MO (US);
Keith W. Wendte, Willowbrook, IL (US)

(73) Assignee: CNH America LLC, New Holland, PA (US)

( * ) Notice: Subject to any disclaimer, the term of this patent is extended or adjusted under 35 U.S.C. 154(b) by 156 days.

(21) Appl. No.: 12/826,263

(22) Filed: Jun. 29, 2010

(65) Prior Publication Data
US 2011/0315411 A1 Dec. 29, 2011

(51) Int. Cl.
*A01B 49/00* (2006.01)
(52) U.S. Cl. .......................... 172/311; 172/456
(58) Field of Classification Search .................. 172/311, 172/456, 452, 310, 458, 459
See application file for complete search history.

(56) References Cited

U.S. PATENT DOCUMENTS

| | | | | |
|---|---|---|---|---|
| 1,776,860 A | * | 9/1930 | Krause | 172/311 |
| 2,246,938 A | | 6/1941 | Holub | |
| 2,787,477 A | * | 4/1957 | Melroe | 172/311 |
| 3,321,028 A | | 5/1967 | Groenke | |
| 3,333,645 A | * | 8/1967 | Gustafson | 172/456 |
| 3,548,954 A | * | 12/1970 | Lindemann | 172/311 |
| 3,606,848 A | * | 9/1971 | Dobbs et al. | 111/57 |
| 3,620,550 A | | 11/1971 | Hornung | |
| 3,810,660 A | | 5/1974 | Peterson | |
| 3,841,412 A | * | 10/1974 | Sosalla | 172/311 |
| 3,990,521 A | * | 11/1976 | Ankenman et al. | 172/311 |
| 4,058,170 A | * | 11/1977 | Ankenman et al. | 172/311 |
| 4,058,172 A | * | 11/1977 | Blair et al. | 172/311 |
| 4,366,867 A | | 1/1983 | Filbrun | |
| 4,425,971 A | * | 1/1984 | Allen | 172/311 |
| 4,529,040 A | * | 7/1985 | Grollimund | 172/311 |
| 4,596,290 A | * | 6/1986 | Bedney | 172/311 |
| 4,646,851 A | * | 3/1987 | Duello | 172/776 |
| 4,896,732 A | * | 1/1990 | Stark | 172/311 |
| 5,251,704 A | * | 10/1993 | Bourgault et al. | 172/311 |
| 5,733,059 A | * | 3/1998 | Anderson | 403/31 |
| 5,839,516 A | * | 11/1998 | Arnold et al. | 172/456 |
| 6,035,942 A | * | 3/2000 | Smith et al. | 172/311 |
| 6,374,923 B1 | * | 4/2002 | Friggstad | 172/383 |
| 6,415,873 B1 | * | 7/2002 | Hudgins | 172/311 |
| 6,494,154 B2 | * | 12/2002 | Kinzenbaw et al. | 111/54 |
| 7,429,003 B2 | | 9/2008 | Thompson et al. | |
| 7,581,597 B2 | * | 9/2009 | Neudorf et al. | 172/311 |
| 7,861,795 B2 | * | 1/2011 | Dillon | 172/452 |
| 2004/0016554 A1 | * | 1/2004 | McDonald | 172/146 |
| 2005/0087350 A1 | | 4/2005 | Bauer | |

FOREIGN PATENT DOCUMENTS

EP 0 551 948 A1 7/1993
GB 2 246 938 A 2/1992

* cited by examiner

*Primary Examiner* — Thomas B Will
*Assistant Examiner* — Jamie L. McGowan
(74) *Attorney, Agent, or Firm* — Rebecca Henkel (57) ABSTRACT

A foldable implement frame is foldable about multiple axes to provide a compactly folded implement. The implement is foldable from a wide, field working position to a relatively narrow position for transport between fields, along roadways, and through field gates or storage doors. The frame is generally comprised of a center frame section that may be hitched to a prime mover, a pair of inner frame sections, and a pair of outer frame sections. The outer frame sections may be folded about their connections to the inner frame sections, and the inner frame sections are foldable about their connections to the central frame section. The central frame section may be rotated to rotate the inner and outer frame sections forward to an upright position, and the inner and outer frame sections may then be folded forward to fold the frame into a narrow position for transport and/or storage.

20 Claims, 6 Drawing Sheets

FOLDABLE FARM IMPLEMENT

BACKGROUND AND SUMMARY OF THE INVENTION

The present invention is directed to farm implements and, more particularly, to a foldable implement frame having several frame elements that are foldable about various folding axes to provide a relatively compact arrangement for transport and stowage of the implement.

Conventional farm implements, such as planters and seeders, generally consist of a center frame that can be hitched to a tractor or other prime mover, and wing booms mounted to opposed sides of the center frame. Depending on the type of implement, row units, scrapers, coulters, and other tools are mounted to the center frame and the wing booms. The overall width of the wing booms and center frame is being increased to provide more space to mount more tools. Such "wider" implements reduce the time necessary to work a field surface, such as planting a crop or tilling up crop residue.

So that such wide implements can be transported over the road, the wing booms may be folded forward in the case of a front-folding implement or stacked over the center frame in the case of a stack-fold implement to reduce the width of the implement. However, for wider implements, such as those having a width exceeding 80 feet, the folded implement can still be quite wide thereby making maneuvering of the implement difficult between crops along narrow roads, over bridges, and through farm gates.

As noted above, one type of folding technique is to fold the wing booms forward. While providing a narrowing of the implement of transport, the length of the wing booms results in an extremely long implement. Thus, while the reduced size accommodates narrow travel paths, it can be difficult to navigate corners that require a tight turning radius or around obstacles such utility poles, mailboxes, and the like that may positioned at a corner.

Further, the row units on planters and seeders are typically mounted so that there is very little clearance between the row units and the top of the planting/seeding surface. For the row units mounted approximate the outward ends of the wing booms, the clearance can be even less. As a result, when the implement is towed through ditches or over terraces or railroad tracks, for example, the row units may hit the ground resulting in damage to either the implement or the row units.

While there is generally a need for wide implements that are better in transport, the increased width has also led to in-field issues. Most notably, the increased width reduces the overall maneuverability of the implement, and therefore increases the likelihood that the wing booms may encounter a field obstruction. If the field obstruction is large or if the implement is being towed at a quickened pace, the obstruction may damage the implement.

Furthermore, the increase in the width of the implement has also brought an increase in the weight of the implement. The weight increase is particularly problematic when the implement is in a folded position for transport. That is, such implements are typically coupled to the three-point hitch of the tractor or prime mover. When the implement is folded, the weight is focused particularly on the three-point hitch, when can result in a relatively unstable tractor or prime mover during transport.

The present invention seeks to overcome the drawbacks of conventional implements by providing a foldable implement frame that is foldable about multiple axes to provide a compactly folded implement. The invention provides an implement that is relatively narrow when in the folded position and thus meets the demands of being transportable between fields, along roadways, and through field gates or storage doors. Furthermore, the invention provides greater clearance of the row units of the implement when the implement is in the transport position thereby reducing the likelihood of contact between the ground or ground objects and the row units. The invention provides a multi-link wing boom that is foldable at one or more points along its length so that an otherwise wide wing boom has a relative narrow profile when in the folded for transport position. For example, in one embodiment, the invention provides an implement frame having a width in excess of 120 feet, e.g., 150-180 feet, and that has a width of approximate 13 feet when folded to the transport position. Moreover, the "length" of the implement remains unchanged between field and transport positions so maneuverability is not sacrificed when the implement is in the transport position. In a further embodiment of the invention, the fold or pivot points along the length of the wing boom include a breakaway feature which allows portions of the wing boom to pivot rearward when an obstruction of sufficient mass is hit.

Therefore, in accordance with one aspect of the invention, an implement frame adapted to be towed by a prime mover along a surface includes a main frame assembly having a first end connectable to the prime mover and a second end, opposite the first end, connected to a central frame member. The central frame member is pivotally connected to the second end of the main frame assembly. The implement further has first and second inner wing frames pivotally mounted to opposed sides of the central frame member at a pair of first pivot connections. The first wing frame has a first pair of parallel frame members extending from the central frame member and the second wing frame has a second pair of parallel frame members extending from the central frame member. First and second outer wing frames are pivotally mounted to the first and second inner wing frames, respectively, at a pair of second pivot connections, wherein the first outer wing frame is pivotally mounted to one of the parallel frame members of the first pair of parallel frame members and the second outer wing is pivotally mounted to one of the parallel frame members of the second pair of parallel frame members. The outer wing frames may be pivoted about vertical axes defined by the second pivot connections to fold the outer wing frames inward toward the central frame member so that the outer wing frames are generally adjacent the inner wing frames. The pivotal connection between the central frame member and the second end of the main frame assembly defines a transverse axis of rotation for the central frame member relative to the second end of the main frame assembly such that the central frame member may be folded forward about the transverse axis of rotation to rotate the inner and outer wing frames forward. The first pair of pivot connections define longitudinal axes of rotation for the first and second inner wing frames relative to the central frame member such that when the outer wing frames are folded to a position adjacent the inner wing frames, the inner wing frames may be pivoted about the longitudinal axes of rotation defined by the first pair of pivot connections to fold the inner and outer wing frames forward in which the inner and outer wing frames are oriented generally above the main frame assembly.

In accordance with another aspect of the invention, a foldable agricultural implement that is foldable between a field position and a stowed position includes a tongue configured to be hitched to a prime mover, a central frame member pivotally connected to the tongue and pivotal approximately 90 degrees about a first axis of rotation from a field position to a stowed position, a first inner wing and a second inner wing pivotally connected to opposed sides of the central frame and pivotal approximately 90 degrees about a second axis of rotation from the field position to the stowed position, and a first outer wing and a second outer wing pivotally connected to the first inner wing and the second inner wing, respectively, and pivotal approximately 180 degrees about a third axis of rotation from the field position to the stowed position.

The invention may also be embodied in a method and, more particularly, in a method for folding an agricultural implement having a central frame member mounted to a main frame assembly, a pair of inner wings pivotally mounted to opposite ends of the central frame member, and a pair of outer wings mounted to the inner wings from an extended, in-field position to a folded, transport position. According to another aspect of the invention, the method includes rotating the outer wings about respective axes of rotation in a generally rearward direction to a position wherein the outer wings are positioned adjacent and behind the inner wings, rotating the central frame member about a lateral axis of rotation to move the central frame member and the inner and outer wings to an upright position. The method further includes folding the inner and outer wings forward to a stowed position generally above the main frame assembly.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION

Figure 1:
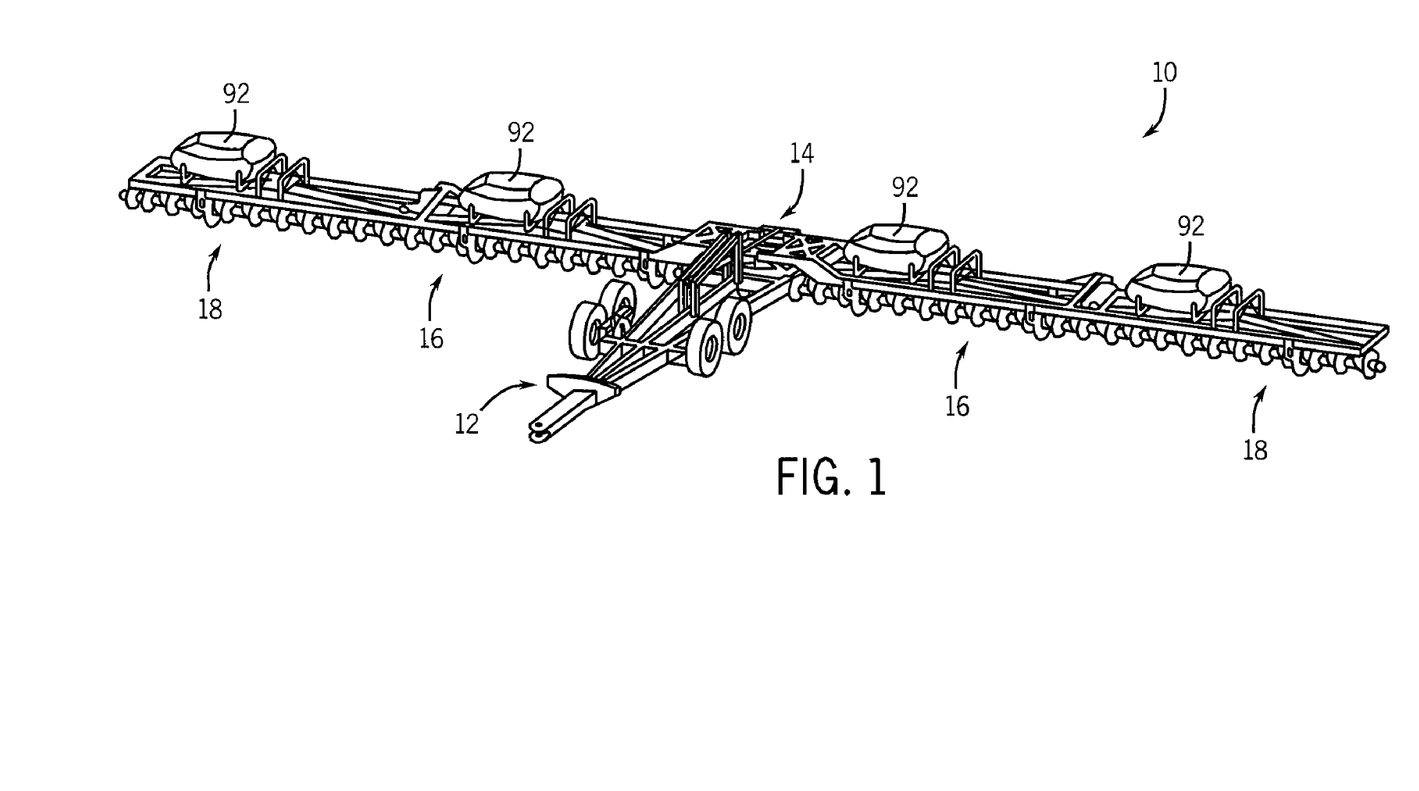
FIG. 1 is an isometric view of foldable implement frame having a central frame member, a pair of inner wings, and a pair of outer wings according to one aspect of the invention.

A foldable frame implement 10 according to one embodiment of the invention is shown in FIG. 1. The implement generally consists of a main frame assembly 12, a central frame member 14, inner wing members 16, and outer wing members 18. As will be described, several pivoting connections are used to interlink these components to allow the implement 10 to be folded from the extended in-field position shown in FIG. 1 to the folded, transport position shown in FIG. 6. While the foldable implement is not limited to any particular size, in one preferred embodiment, the implement has a width of 90 feet. In another embodiment, the implement has a width of 120 feet. In yet another embodiment, the implement has a width of 150 feet, and in a further embodiment, the implement has a width of 180 feet. It is also contemplated that the implement may have a width different from those listed above, including a width greater than 180 feet.

Figure 2:
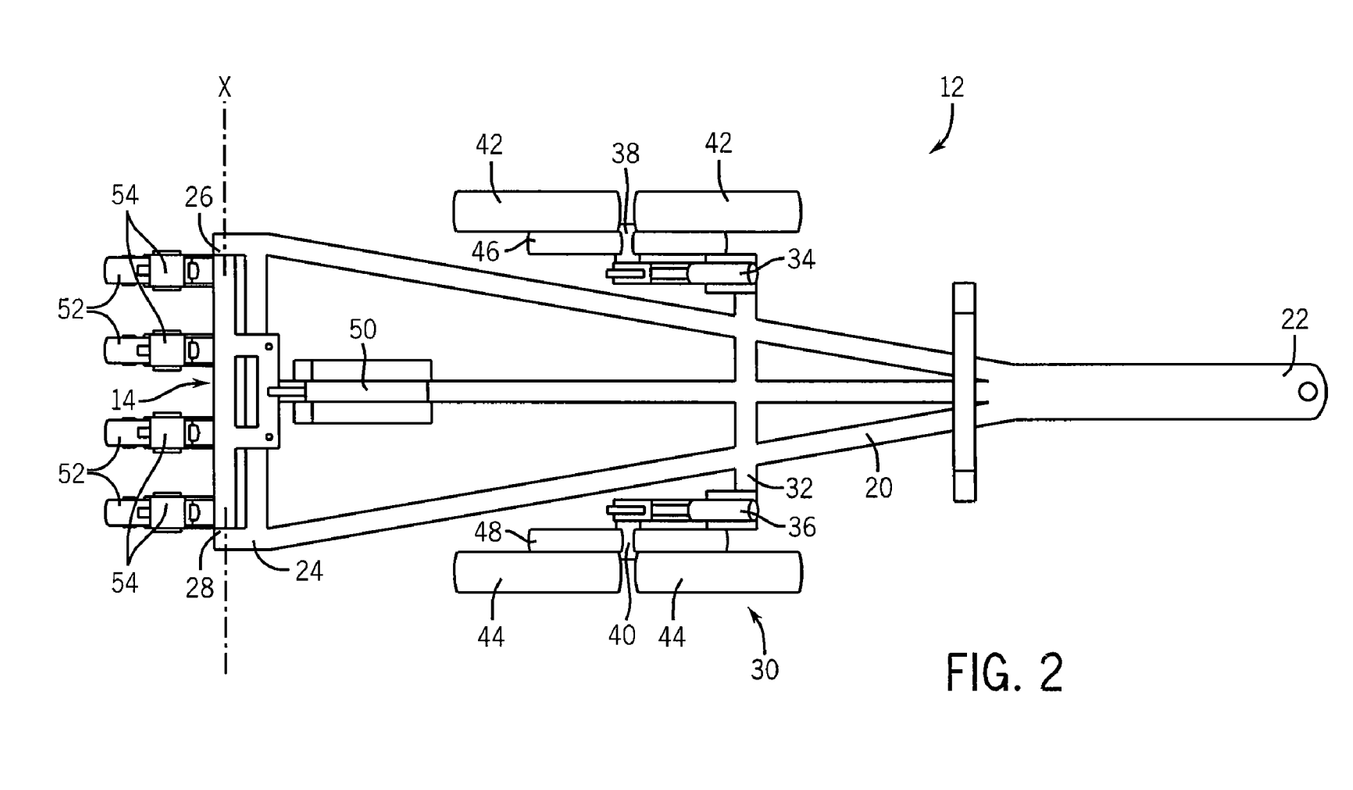
FIG. 2 is a top view of the main frame assembly of the foldable implement of FIG. 1 with a center section of the main frame assembly in a transport position.
Figure 6:
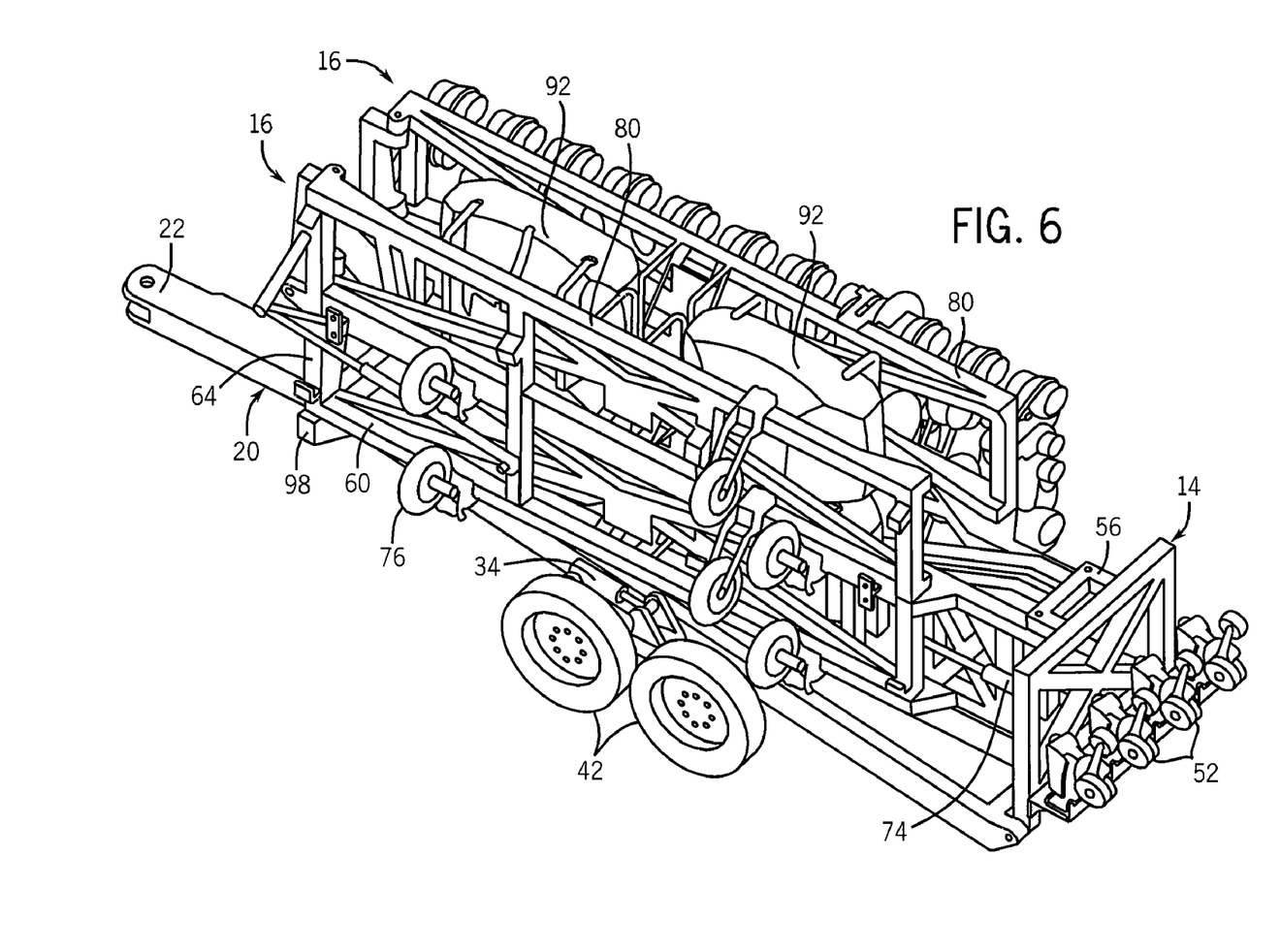
FIG. 6 is an isometric view of the foldable implement of FIG. 1 in a stowed position with the central frame member rotated about a lateral axis of rotation to rotate the outer and inner wings forward to the stowed position.

With additional reference to FIG. 2, the main frame assembly 12 has an A-frame 20 with a leading end 22 adapted to be hitched to a prime mover, e.g., tractor, in a known manner. A trailing end 24 of the A-frame 20 is pivotally coupled to the central frame member 14 by a pair of pivot connections 26, 28. The pivot connections 26, 28 permit pivoting or rotation of the central frame member 14 along a lateral axis X that is generally transverse to the length of the A-frame 20, as will be described in greater detail below. The main frame assembly 12 includes a pivoting subframe 30 that is coupled to frame member 32 of the A-frame 20. The pivoting subframe 30 includes a pair of hydraulic cylinders 34, 36 interconnected between the frame member 32 and a pair of axles 38, 40, respectively. Tires 42, 44 are rotatably mounted to the axles 38, 40, respectively. A walking beam 46, 48 is pivotally coupled to each of the axles 38, 40, respectively. The axles 38, 40 can be pivotally raised and lowered by the hydraulic cylinders 34, 36. As will be described in greater detail below, when the implement 10 is in the folded position (FIG. 6), the axles 38, 40 are lowered relative to the A-frame 20 and, more particularly, to frame member 32. In this lowered position, the tires 42, 44 are similarly lowered, which causes the A-frame 20 to be raised. The tires 42, 44 thus support the A-frame, and as shown in FIG. 6, the implement as a whole when the implement is in the folded position. Conversely, when the implement 10 is in the field working position, the hydraulic cylinders 34, 36 raise the axles 38, 40 and thus raise the tires 42, 44.

It will be appreciated that the position of the pivoting subframe 30 relative to the A-frame 20 is longitudinally placed so that there is a minimum amount of weight placed on the tractor drawbar (not shown) when the implement 10 is in the folded position. As the tires 42, 44 are only used for supporting the implement 10 during transport, it is preferred for tires 42, 44 to be better suited for transport along roadways rather than along a planting surface. In this regard, in a preferred embodiment, the tires 42, 44 are similar to those used with over-the-road semitrailers, e.g., have a diameter of at least 35 inches and, preferably, 40 inches. The oversize of the tires 42, 44 has a number of advantages. For instance, the larger tires help to elevate the implement 10 above the roadway during transport thereby providing more clearance for the implement 10. The tires 42, 44 are rated for higher speeds, which allows for higher transport speeds and thus a time savings during transport of the implement 10. The larger tires 42, 44 can handle heavier loads and thus support the weight of the folded implement 10.

As noted above, the central frame member 14 is pivotally mounted to the A-frame 20. In this regard, a lift cylinder 50 is interconnected between the central frame member 14 and the A-frame 20. The lift cylinder 50 rotates the central frame 14 forward, i.e., toward the prime mover, to move the implement 10 to the position shown in FIG. 3. Conversely, when the implement 10 is in the field working position, FIG. 1, the lift cylinder 50 operates to keep the position of the central frame member 14 fixed relative to the A-frame 20. In a preferred embodiment, four row units 52 are mounted to the central frame member 14 by respective parallel linkage arrangements 54 that allow the row units 52 to individually move vertically relative to the central frame member 14, so as to lower the row units 52 into a field engaging position, for example. Alternately, the row units 52 could be mounted to a shared or common pivot so that the row units are moved together as a single assembly.

Figure 3:
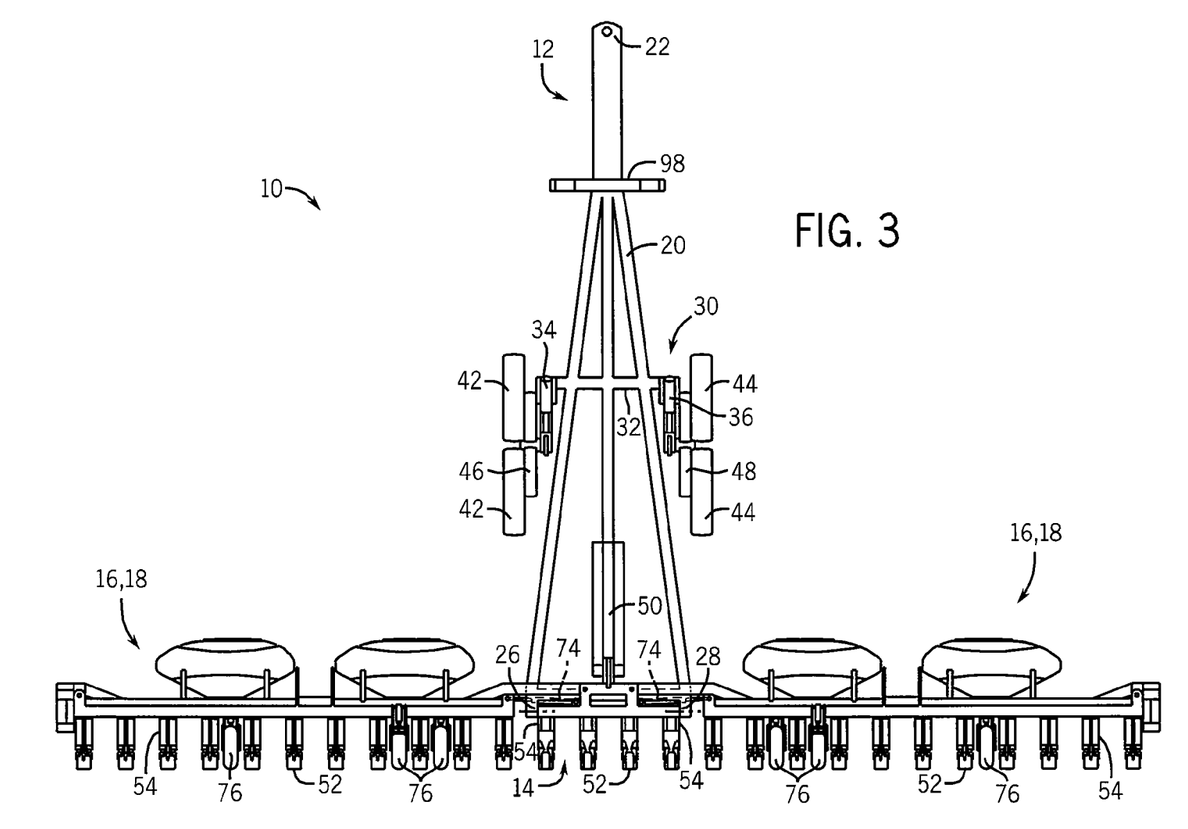
FIG. 3 is an isometric view of the foldable implement of FIG. 1 with the central frame member rotated about a lateral axis of rotation.
Figure 4:
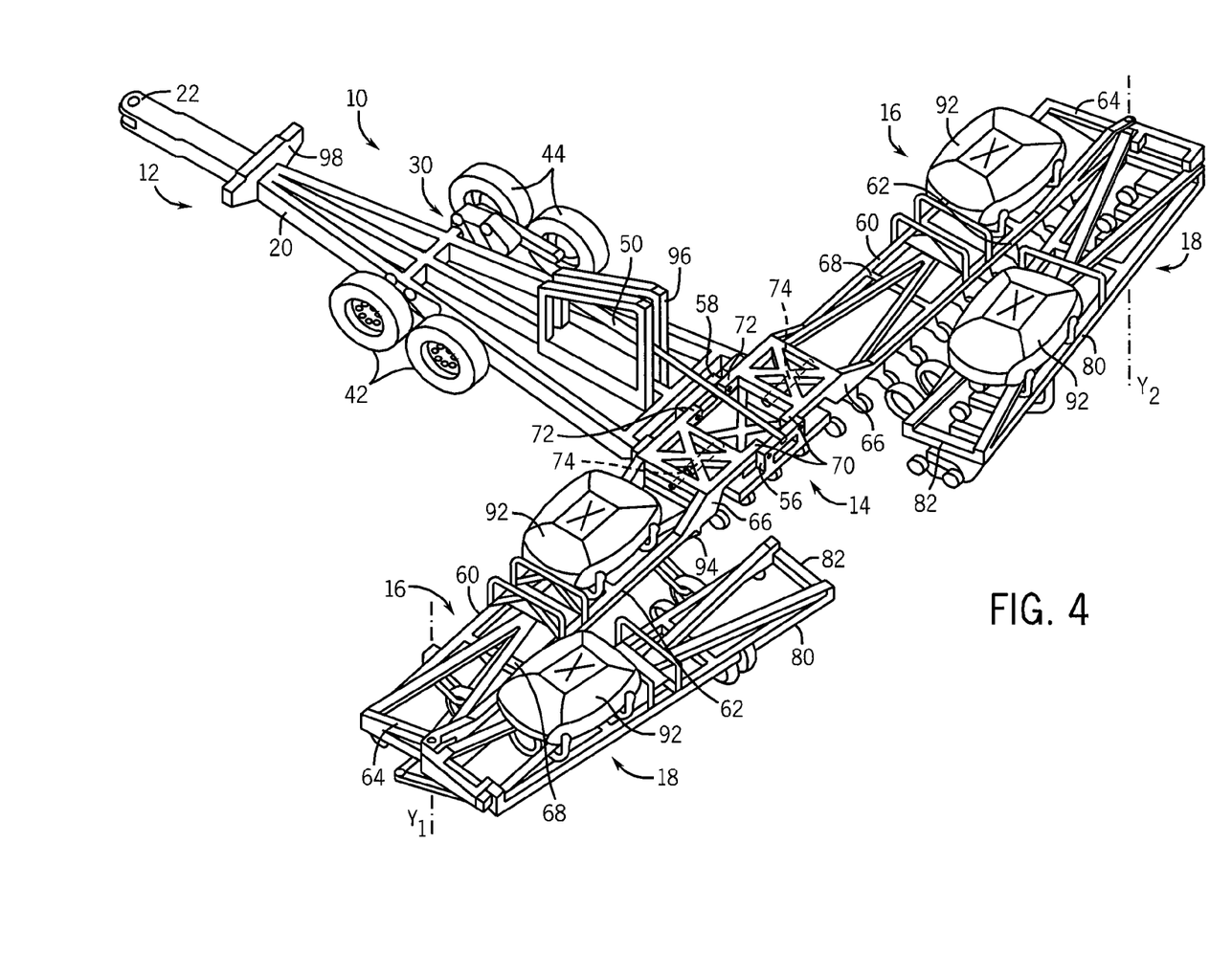
FIG. 4 is an isometric view of the foldable implement of FIG. 1 with the outer wings pivoted partially rearward about respective axes of rotation according to the present invention.

Referring now to FIGS. 1, 3, and 4, inner wing members 16 are pivotally coupled to the central frame member 14. More particularly, the central frame member 14 includes a pair of mounting flanges 56, 58 spaced from one another. Each of the inner wing members 16 comprises a frame arrangement generally including leading and trailing tubular members 60, 62, respectively, an outer end tubular member 64, and an inner mounting member 66. It will be appreciated that the inner wing members 16 may include additional tubular members, such as cross-members not specifically described herein, to add structural integrity to the wing members 16, such as cross-bars 68. The inner mounting members 66 each include a pair of mounting posts 70, 72 that are pivotally mounted to respective portions of the mounting flanges 56, 58. The pivoting connections between the mounting members 66 and the mounting flanges 56, 58 allow the inner wing members 16 to be pivoted or rotated about axes $Z_1$ and $Z_2$, FIG. 5, extending parallel to one another through the pivoting connections. The longitudinal axes are orthogonal to the lateral axis about which the central frame member 14 is rotated. Hydraulic cylinders 74 are connected between the central frame member 14 and the inner wing members 16, and are operative to lift and lower the inner wing members 16. When the cylinders 74 have fully rotated the inner wing members 16 from their respective field working positions, the inner wing members 16, and the outer wing members 18 as will be described below, are rotated from the substantially upright position shown in FIG. 3 to the folded position shown in FIG. 6. When the inner wing members 16 are in the field working position, FIG. 1, the cylinders 74 are allowed to float so that the inner wing members 16 can respond to changes in ground contour.

In a preferred embodiment, eight to ten row units 54 are mounted to each of the inner wing members 16. Additionally, gauge wheels 76 are pivotally mounted to each of the inner wing members 16 and provide support for the inner wing members 16 when the wing members 16 are in the field working position. The gauge wheels 76 are used to maintain a desired height of the inner wing members 16 relative to the ground when the wing members 16 are in the field working position. The gauge wheels 76 may be raised and lowered by hydraulic cylinders (not shown) or some other known actuation device. In a preferred embodiment there are two gauge wheels 76 pivotally mounted to each inner wing member 16 and two gauge wheels 76 are pivotally mounted to each outer wing member 18.

Figure 5:
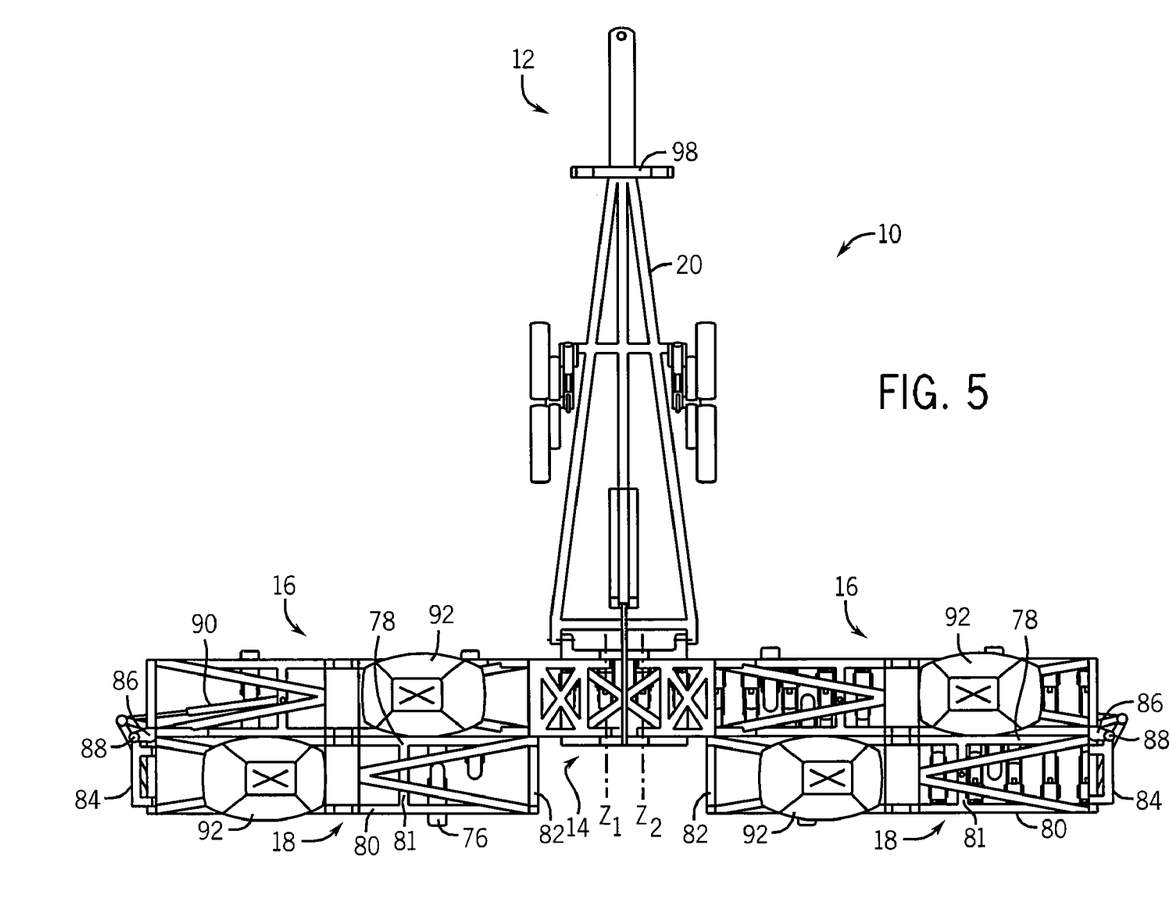
FIG. 5 is a top plan view of the foldable implement of FIG. 1 with the outer wings pivoted fully rearward about the respective axes of rotation according to the present invention.

Referring now to FIGS. 1, 4, and 5, each outer wing member 18 is pivotally coupled to a respective one of the inner wing members 16. Similar to the inner wing members 16, the outer wing members 18 are generally comprised of a rectangular shaped frame and, in this regard, include a leading tubular member 78 and a trailing tubular member 80, and a series of cross bars, such as cross bar 81 that conjoin the tubular members 78, 80 and provide structural integrity to the outer wing members 18. Each outer wing member 18 includes a pair of end members 82, 84 that are interconnected between the leading and the trailing tubular members 78, 80. The end members 82 define the outer end of the outer wing members 18 whereas each end member 84 is pivotally coupled to a respective one of the of inner wing members 16. More particularly, each inner wing member 16 has a mounting flange 86 connected to, or integrally formed with, trailing tubular members 62. The end members 84 are each machined to have a transversely oriented bore (not shown) that aligns with a corresponding bore (not shown) in the corresponding mounting flange 86. A pivot pin 88 joins the end members 84 to the mounting flange 86, and does so in a manner that allows the outer wing members 18 to pivot about a respective vertical axis defined through the pivot pin 88.

A hydraulic cylinder 90 is interconnected between each inner wing member 16 and each outer wing member 18, and is operative to fold the outer wing member 18 about the vertical axes $Y_1$ and $Y_2$, FIG. 4. Preferably, the connection of the outer wing member 18 to the inner wing member 16 and operation of the cylinder 90 allows the outer wing member to be pivoted or rotated approximately 180 degrees. In this regard, the outer wing members 18 may be pivoted rearwardly about axis Y to a position behind the inner wing members 16, as shown in FIG. 5. The hydraulic cylinders 90 hold the outer wing members 18 in this folded position as the implement 10 is folded, as will be described. When the implement 10 is in the field working position, the hydraulic cylinders 90 are locked so that the outer wing members 18 are not rotated unintentionally. However, in a preferred embodiment, the cylinders are arranged and configured such any trapped hydraulic fluid in the cylinders is allowed to escape the cylinders via a relief valve (not shown) when an outer wing member 18 contacts a field obstruction to allow the outer wing member 18 to pivot rearwardly to clear the obstruction and prevent damage to the implement 10.

Gauge wheels 76 are also pivotally mounted to the outer wing members 18 and set the depth of the outer wing members 18 at a desired height. Preferably, the gauge wheels 76 are all hydraulically controlled by a set of slave hydraulic cylinders (not shown) that are connected to a master hydraulic cylinder (not shown). Hydraulic fluid flows from the master through a splitter (not shown) to the series of slave hydraulic cylinders. In this regard, all of the gauge wheels 76 are raised and lowered in unison to maintain alignment of the central frame member 14, the inner wing members 16, and the outer wing members 18 when the implement 10 is in the field working position. It is also possible for the depth of the gauge wheels to be controlled electronically or pneumatically.

As described above, the present invention can be used with different types of agricultural implements, such as planters, seeders, drills, and the like. As such, it is contemplated that bulk fill hoppers 92 may be mounted to the outer and inner wing members. As known in the art, particulate matter, e.g., seed, is metered from the bulk fill hoppers 92 to the individual row units 52. In one embodiment, there is a bulk fill hopper on each of the inner wing members and each of the outer wing members. Moreover, the position of the bulk fill hoppers 92 on the wing members is such that the bulk fill hoppers 92 do not inhibit folding of the implement 10, as shown in FIG. 6 for example. As shown in FIG. 6, the bulk fill hoppers 92 are nested when the implement is in the folded position.

Additionally, while the implement 10 has been described as being hitched to a prime mover, it is understood that the main frame assembly 12 could be coupled to an air cart, for example, that is in turn coupled to a prime mover.

While alluded to above, the following paragraphs provide a description of the various acts that take place during folding and unfolding of the implement. It will be appreciated that the implement and/or the prime mover may include various operator controls to effectuate the movements of the implement 10. The operator controls may be mechanical, electrical, electromechanical, magnetic, and the like. Moreover, while hydraulic cylinders have been described, it is understood that other types of actuators could be used.

To fold the implement 10 from the field working position, FIG. 1, to the folded position, FIG. 6, the implement 10 is first raised to the field transport position by lowering all of the gauge wheels 76, which effectively raises the implement 10 relative to the field surface. The horizontal fold cylinders 90 are then activated to fold the outer wing members 18 rearward about vertical axes $Y_1$ and $Y_2$. In the fully folded position, the outer wing members 18 are positioned rearward of the inner wing members 16 as shown in FIG. 5. In a preferred embodiment, the inner wing members 16 include supports 94 mounted to, or formed with, the trailing tubular member 62. When the outer wing members 18 are fully folded, the end members 82 rest upon the supports 94.

With the outer wing members 18 folded behind the inner wing members 16, wheels 42, 44 are then lowered by cylinders 34, 36 which lifts the frame members 14, 16, and 18 and the gauge wheels 76 off the ground. Once this operation is complete, cylinder 50 is activated to rotate the central frame member 14 forward about lateral axis X. This rotation of the central frame member 14 also causes the outer and inner wing members to rotate forward to the upright position shown in FIG. 3. When the central frame 14 is reaches a substantially 90 degree position, as shown in FIG. 3, the central frame 14 is supported by frame support 96 mounted to the A-frame 20. Alternately, the wheels 42, 44 could be lowered after the implement is folded vertically or forward. Moreover, it is contemplated that stabilizers (not shown) could be used on the rear of the main frame during the vertical/front fold/unfold to reduce, if not eliminate, negative torque weight.

In the next operation, cylinders 74 are activated to fold the inner wing members 16 forward. The outer wing members 18, which are carried by the inner wing members 16, also fold forward. The A-frame includes support bar 98 upon which the inner wing members 16 are seated when the inner wing members 16 are completely folded forward to a position above the main frame assembly 12, as shown in FIG. 6. The implement 10 is now ready for transport. To unfold the implement, the aforementioned acts are repeated in reverse.

Folding of the implement 10 has been described with respect to first folding the outer wing members, followed by rotation of the central frame member, and then folding of the inner and outer wing members. In another embodiment, the folding process begins with folding of the outer wing members, followed by rotation of the inner and outer wing members about longitudinal axes of rotation, and then rotating the central frame about its lateral axis of rotation to lower the inner and outer wings into position over the main frame assembly.

It will be appreciated that the frame may be of single fabricated tube constructed. Further, the center row units may be mounted to the main frame assembly rather than the center frame section.

It will be appreciated that the invention provides an implement that is relatively narrow when in the folded position and thus meets the demands of being transportable between fields, along roadways, and through field gates or storage doors. The invention further provides greater clearance of the row units of the implement when the implement is in the transport position thereby reducing the likelihood of contact between the ground or ground objects and the row units. In one embodiment, implement frame in the field working position has a width in excess of 120 feet, e.g., 150-180 feet, and has a width of approximately 13 feet when folded to the transport position. Moreover, the "length" of the implement, i.e., the distance between the implement and the prime mover, remains unchanged between field and transport positions so maneuverability is not sacrificed when the implement is in the transport position.

Many changes and modifications could be made to the invention without departing from the spirit thereof. The scope of these changes will become apparent from the appended claims.

We claim:

1. A foldable agricultural implement towable over a supporting surface that is foldable between a field position and a stowed position, comprising:
  a tongue configured to be hitched to a prime mover;
  a main frame assembly having a first end connectable to the prime mover and a second end, opposite the first end, connected to a central frame member, wherein the central frame member is pivotally connected to the second end of the main frame assembly;
  a central frame member pivotally connected to the tongue and pivotal approximately 90 degrees about a first axis of rotation from a field position to a stowed position;
  a first inner wing and a second inner wing pivotally connected to opposed sides of the central frame and pivotal approximately 90 degrees about a second axis of rotation from the field position to the stowed position; and
  a first outer wing and a second outer wing pivotally connected to the first inner wing and the second inner wing, respectively, and pivotal approximately 180 degrees about a third axis of rotation from the field position to the stowed position; wherein the outer wing frames are oriented above the adjacent inner wing frames and the main frame assembly; and the inner wing frames are oriented between outer wing frames and the main frame assembly.

2. The foldable implement of claim 1 further comprising a plurality of hydraulic cylinders operative to fold the first and the second outer wings, the first and the second inner wings, and the central frame member from the field position to the stowed position.

3. The foldable implement of claim 1 further comprising first and second walking beams pivotally mounted to opposed sides of the main frame assembly, and further comprising at least one tire rotatably mounted to each of the walking beams.

4. The foldable implement of claim 3 wherein the at least one tires have a diameter of at least 35 inches.

5. The foldable implement of claim 4 wherein the at least one tires have a diameter of 40 inches.

6. The foldable implement of claim 3 further comprising lift actuators associated with the walking beams and the at least one tires, and operative to lift the at least one tires to an elevated position when the implement is in the field position.

7. The foldable implement of claim 1 further comprising 8-10 row units mounted to each inner wing, and 8-12 row units mounted to each outer wing.

8. The foldable implement of claim 1 wherein the central frame member, the inner wings, and the outer wings have a collected width, when the implement is in the field position, of greater than 90 feet.

9. The foldable implement of claim 8 wherein the collective width is greater than 120 feet.

10. For an agricultural implement having a central frame member mounted to a main frame assembly, a pair of inner wings pivotally mounted to opposite ends of the central frame member, and a pair of outer wings mounted to the inner wings, a method for folding the implement from an extended, in-field position to a folded, transport position, the method comprising:

rotating the outer wings about respective first vertical axes of rotation in a generally rearward direction to a position wherein the outer wings are positioned adjacent and behind the inner wings;

rotating the central frame member about a lateral axis of rotation to rotate the central frame member and the inner and outer wings forward to an upright position; and rotating the inner wings about respective second vertical axes of rotation to a position in which:
- the outer wing frames are orientated above the adjacent inner wing frames and the main frame assembly; and
- the inner wing frames are oriented between outer wing frames and the main frame assembly.

11. An implement frame adapted to be towed by a prime mover along a surface, the apparatus comprising:

a main frame assembly having a first end connectable to the prime mover and a second end, opposite the first end, connected to a central frame member, wherein the central frame member is pivotally connected to the second end of the main frame assembly;

first and second inner wing frames pivotally mounted to opposed sides of the central frame member at a pair of first pivot connections, the first wing frame having a first pair of parallel frame members extending from the central frame member and the second wing frame having a second pair of parallel frame members extending from the central frame member;

first and second outer wing frames pivotally mounted to the first and second inner wing frames, respectively, at a pair of second pivot connections, wherein the first outer wing frame is pivotally mounted to one of the parallel frame members of the first pair of parallel frame members and the second outer wing is pivotally mounted to one of the parallel frame members of the second pair of parallel frame members, and wherein the outer wing frames may be pivoted about vertical axes defined by the second pivot connections to fold the outer wing frames inward toward the central frame member so that the outer wing frames are generally adjacent the inner wing frames;

wherein the pivotal connection between the central frame member and the second end of the main frame assembly defines a transverse axis of rotation for the central frame member relative to the second end of the main frame assembly such that the central frame member may be folded forward about the transverse axis of rotation to rotate the inner and outer wing frames to a substantially upright position in which the inner and outer wing frames are positioned generally perpendicular to the surface;

wherein the first pair of pivot connections define longitudinal axes of rotation for the first and second inner wing frames relative to the central frame member such that when the outer wing frames are folded to a position adjacent the inner wing frames, the inner wing frames may be pivoted about the longitudinal axes of rotation defined by the first pair of pivot connections to fold the inner and outer wing frames to forward position in which:
- the outer wing frames are orientated above the adjacent inner wing frames and the main frame assembly; and
- the inner wing frames are oriented between outer wing frames and the main frame assembly.

12. The implement frame of claim 11 the first pair of parallel frame members includes a forward frame member and a rearward frame member and wherein the second pair of parallel frame members includes a forward frame member and a rearward frame member, and wherein the outer wing frames are pivotally coupled to respective rearward frame members so that the outer wing frames are pivoted rearward to a position behind the inner wing frame members when the outer wing frames are folded about the second pivot connections.

13. The implement frame of claim 11 further comprising first and second inner hoppers supported by the first and second inner wing frames, respectively, and first and second outer hoppers supported by the first and second outer wing frames, respectively.

14. The implement frame of claim 11 further comprising a plurality of hydraulic actuators operative to fold the central frame member, the inner wing frames, and the outer wing frames between an extended working position and a folded position.

15. The implement frame of claim 14 wherein at least one hydraulic cylinder allows an outer wing frame to fold rearwardly about a second pivoting connection when the outer wing frame encounters a field obstruction of sufficient mass.

16. The implement frame of claim 11 wherein the central frame member, the inner wing frames, and the outer wing frames have a collective width greater than 90 feet when in an extended working position.

17. The implement frame of claim 16 wherein the collective width is greater than 120 feet.

18. The implement frame of claim 17 wherein the collective width is approximately 180 feet.

19. The implement frame of claim 11 further comprising 8-10 row units mounted to each of the inner wing frames.

20. The implement frame of claim 19 further comprising 8-12 row units mounted to each of the outer wing frames.

* * * * *